(12) United States Patent
Old et al.

(10) Patent No.: US 11,384,831 B2
(45) Date of Patent: Jul. 12, 2022

(54) ADAPTER PLATE AND GEAR WITH AN ADAPTER PLATE

(71) Applicant: WITTENSTEIN SE, Igersheim (DE)

(72) Inventors: Christof Old, Bad Mergentheim (DE); Reinhold Kuhn, Lauda-Königshofen (DE)

(73) Assignee: WITTENSTEIN SE, Igersheim (DE)

( * ) Notice: Subject to any disclaimer, the term of this patent is extended or adjusted under 35 U.S.C. 154(b) by 0 days.

(21) Appl. No.: 17/219,536

(22) Filed: Mar. 31, 2021

(65) Prior Publication Data

US 2021/0310554 A1    Oct. 7, 2021

(30) Foreign Application Priority Data

Apr. 1, 2020 (DE) .......................... 102020109057.9

(51) Int. Cl.
*F16H 57/04* (2010.01)
*F16H 57/021* (2012.01)
*F16H 57/02* (2012.01)

(52) U.S. Cl.
CPC ....... *F16H 57/0424* (2013.01); *F16H 57/021* (2013.01); *F16H 57/04* (2013.01); *F16H 57/0449* (2013.01); *F16H 2057/02034* (2013.01)

(58) Field of Classification Search
CPC .... F16H 57/021; F16H 57/04; F16H 57/0421; F16H 57/0424; F16H 57/0449; F16H 2057/02034
See application file for complete search history.

(56) References Cited

U.S. PATENT DOCUMENTS

| | | | | |
|---|---|---|---|---|
| 2,240,118 | A | * 4/1941 | Matthews | ........... F16C 33/6659 184/11.1 |
| 7,905,326 | B2 | * 3/2011 | Kiyosawa | ............. F16H 49/001 184/6.12 |
| 2019/0242470 | A1 | 8/2019 | Schmidt et al. | |
| 2020/0141482 | A1 | * 5/2020 | Plasse | ..................... F16N 7/366 |

FOREIGN PATENT DOCUMENTS

| | | |
|---|---|---|
| DE | 10 2015 105 609 A1 | 2/2016 |
| DE | 10 2016 012 501 A1 | 4/2018 |
| FR | 2622946 A1 | 5/1989 |
| KR | 20140079788 A * | 6/2014 ........... F16H 57/045 |

OTHER PUBLICATIONS

Search Report for German Patent Application No. 102020109057.9 dated Nov. 16, 2020.

* cited by examiner

*Primary Examiner* — Adam D Rogers
(74) *Attorney, Agent, or Firm* — Meunier Carlin & Curfman LLC

(57) ABSTRACT

The invention relates to an adapter plate for connecting a motor and a housing of a gear, having a passage opening for receiving a shaft coupling at least partially, a groove arranged in a first front side of the adapter plate (1, 101) and extending circumferentially around the passage opening, and at least one channel which is in communication with the groove.

17 Claims, 2 Drawing Sheets

ADAPTER PLATE AND GEAR WITH AN ADAPTER PLATE

CROSS REFERENCE TO RELATED APPLICATION

This application claims priority to and benefit of German patent application DE 102020109057.9 filed Apr. 4, 2020, which is fully incorporated by reference and made a part hereto.

TECHNICAL FIELD

The invention relates to an adapter plate for connecting a motor and a housing of a gear, and to a method for operating a gear.

STATE OF THE ART

From the state of the art, adapter plates are known for connecting a motor and a housing of a gear.

In motor-gear combinations, a transgression of oil or grease from the gear into the motor may cause problems. Sealings are provided for avoiding such a transgression.

In order to recognize the risk which might arise of potentially transgressing oil when the sealing between the motor and the gear fails, solutions are known from the state of the art to provide leakage sensors such as described in the document DE 10 2015 105 609 A1, for example. Known solutions, however, recognize leakage but cannot prevent the transgression in particular in installation positions having a gear perpendicularly arranged above the motor. The solutions known from the state of the art, such as, for example shown in the document FR 2 622 946 A1, are complicated and comparably laborious to install. Moreover, such solutions in turn prevent the leakage to be recognized by means of the sensor mentioned above.

DISCLOSURE OF THE INVENTION

It is a task of the invention to solve the problems of the state of the art at least partially. It is in particular a task of the invention to provide for an improved possibility by means of which an imminent transgression of lubricant from a gear into a motor can be recognized or prevented. Furthermore, it is a task of the invention to propose a corresponding gear and a corresponding method for operating such a gear.

The task is solved by an adapter plate and method as disclosed herein Advantageous further developments and embodiments will result from the dependent claims and from this description.

One aspect relates to an adapter plate for connecting a motor and a housing of a gear, having a passage opening for receiving a shaft coupling at least partially, a groove arranged in a first front side of the adapter plate and circumferentially extending around the passage opening, and at least one channel which is in communication with the groove.

A further aspect relates to a gear having an adapter plate attached to a housing of the gear in one of the typical embodiments described herein.

A further aspect relates to a method for operating a gear in one of the typical embodiments described herein, wherein the axis of the shaft coupling is oriented to be at least substantially vertical.

The term "at least substantially vertical" in this context means in particular an angular range of a maximum of 10° deviation from the vertical, a maximum of 5° deviation or a maximum of 2° deviation from the vertical. In typical embodiments, the at least one channel is oriented to be at least substantially radial. Typically, "at least substantially" is to be understood in analogy with the definition above having corresponding angular ranges.

The shaft coupling is in particular provided for receiving a drive shaft such as a motor shaft, or a gear driving shaft of a gear installed in the input side. The shaft coupling may comprise, for example, a push-on sleeve and a clamping ring clamping the push-on sleeve, or a two-part sleeve clamped by a clamping ring, in which the two parts of the sleeve are welded together by a bellow. Typically, the clamping ring is arranged in the axial area of a larger second diameter of the passage opening of the adapter plate.

In typical embodiments, the groove is configured to be concentrically extending around the circumference of the passage opening. The groove may be interrupted or include a variable cross-section across the circumference. In exemplary embodiments, the groove is configured circumferentially to have a uniform cross-section, for example, to have a U-shaped or V-shaped cross-section.

Typically, the at least one channel comprises an overflow channel for discharging lubricant from the groove to the outside of the adapter plate. In typical embodiments, an overflow channel is provided extending from the groove in particular to a circumferential surface of the adapter plate. The adapter plate typically has two front sides. Typical adapter plates comprise a front side on the gear side, which can also be referred to as a first front side. Embodiments comprises a front side on the motor side, which can also be referred to as a second front side, and which is in particular opposite to the front side on the gear side. The circumferential surfaces delimiting the adapter plate to the outside in the radial direction with respect to the axis of the passage opening, may be rounded or even. Typical circumferential surfaces of embodiments comprise at least a channel opening, for example, a channel opening of an overflow channel or a sensor channel.

In typical adapter plates of embodiments, the at least one channel comprises a first sensor channel and a first sensor in communication with the first sensor channel.

In typical adapter plates of embodiments, the at least one channel comprises a second sensor channel and a second sensor in communication with the second sensor channel. Further channels, in particular sensor channels each having sensors associated can be provided in embodiments.

Typically, the first sensor channel or the second sensor channel is in each case suitable to detect lubricant. Typical sensors of exemplary embodiments are configured as leakage sensors, for example, as capacitive sensors. Alternatively, optical sensors may be employed for detecting lubricant.

Sensor channels of embodiments typically extend from the groove to a sensor receptacle, in which the sensor is received. Such a sensor receptacle, for example, may be a recess in a side wall of the adapter plate or else may be arranged within the adapter plate. In further exemplary embodiments, a sensor channel may be guided also to the outside of the adapter plate so that an arrangement of the corresponding sensor is possible outside the adapter plate.

Typical adapter plates are provided for an installation position having an at least substantially vertically standing axis of the shaft coupling, with the groove being arranged on the upper front side, and with the second sensor channel including a horizontally higher board in an outer wall of the groove than the first sensor channel. In such an arrangement, the first front side is the upper front side of the adapter plate on the gear side. Typically, the axis of the passage opening corresponds to the axis of the shaft coupling or the axis of rotation of the shaft coupling. A lower "board" for the first sensor channel may also be understood in this application that no board whatsoever is present. The lower edge of the first sensor channel may in particular be located at the same height or lower than the deepest region of the groove.

Typically, the first sensor channel and the second sensor channel are arranged in different axial planes. "Different axial planes" in this context means a different position in the axial direction of the adapter plate.

By the board of the second sensor channel that is situated higher, or by the arrangement in different axial planes, it may be achieved that the two sensors are applied with different leakage amounts of lubricant, for example oil or grease, in the groove. For example, the first sensor may be used for a warning function, and the second sensor in the sensor channel situated higher may be used for an alarm function. Typically, the overflow board of the overflow channel is situated higher than the board of the second sensor channel. When large leakage amounts arise, for example, leakage liquid may thus be prevented from getting into the motor. Typically, the overflow channel is arranged in another axial plane than the sensor channel or the sensor channels.

Typically, the sensor channels and the overflow channel, respectively, are arranged spaced from one another in the circumferential direction of the groove. An exemplary arrangement may provide an angle of at least 30° or at least 60° or at least 90° between the individual channels. In this way, each channel has enough space in the outer wall of the groove. Typically, the channels each are arranged at least substantially perpendicular to a planar circumferential surface of the adapter plate, or are arranged at least substantially in the radial direction.

Typically, the at least one channel, for example the first, the second sensor channel or the overflow channel, are inclined with respect to a plane situated perpendicular to the direction of the passage opening. In this way, it is achieved, in particular in the overflow channel, that in case of a vertical installation, a flow-off of the arising leakage liquid can be ensured. Typical angles with respect to the plane are more than 0° and/or less than 30° or less than 20°. In further embodiments, the channel is installed horizontally in the plane. Leakage liquid may be pressed to the outside by the force of weight of liquid within the groove.

In typical adapter plates, the passage opening has at least a first diameter and a second diameter which is larger with respect to the first diameter, with the groove being arranged at least partially in an axial area of the first diameter. In this way, an inward projection is created in the area of the groove so that the groove can take up leakage liquid leaking from the gear interior space and dripping off the bearing. In typical embodiments, the smaller, first diameter of the passage opening is arranged on the first front side of the adapter plate on the gear side.

In a typical gear, the first diameter of the passage opening of the adapter plate is smaller than an outer diameter of a drive bearing for mounting the shaft coupling. Typically, the adapter plate is arranged adjacent to the drive bearing for mounting the shaft coupling. In typical embodiments, a push-on sleeve or a part of a sleeve of a bellow coupling is mounted by the drive bearing. Lubricant dripping off the drive bearing can be collected by the groove, in particular when the axis of the shaft coupling is standing vertically. In typical embodiments, the first diameter is smaller than or equal to an outer diameter of the shaft coupling.

In typical embodiments of gears, the groove of the adapter plate is configured, in an axial projection, to be at least partially overlapping with the drive bearing. In the area of the drive bearing, a sealing, in particular a radial shaft sealing ring may be provided for sealing an interior space of the gear filled with a lubricant such as oil or grease. If lubricant leaks from the sealing, it can be collected in embodiments by means of the groove.

Typical gears comprise a bearing flange which is arranged between the adapter plate and the housing of the gear. Typically, at least two parts of the group consisting of the bearing flange, the adapter plate, the housing of the gear or the housing of a motor are screwed together.

In typical gears, the bearing flange engages in the axial direction, in particular partially or slightly with the groove. Thus, a positional securement or centering of the bearing flange may be achieved by means of the adapter plate.

Typical embodiments of gears have a shaft coupling accommodated within the bearing flange. In this way, a compact construction can be achieved.

Advantages of typical embodiments may be that an integrated fail-safe solution for detecting and discharging a leakage is provided, in particular without additional required constructional space being necessarily created. In embodiments, additional mechanical components do not necessarily exist. In typical embodiments, it is possible to achieve a protection of the added electric motor from penetrating lubricant and against a possible contamination of an encoder.

BRIEF DESCRIPTION OF THE DRAWINGS

The present invention will be explained below in more detail on the basis of the attached drawings, wherein the Figures are described as follows.

DESCRIPTION OF EXEMPLARY EMBODIMENTS

Figure 1:
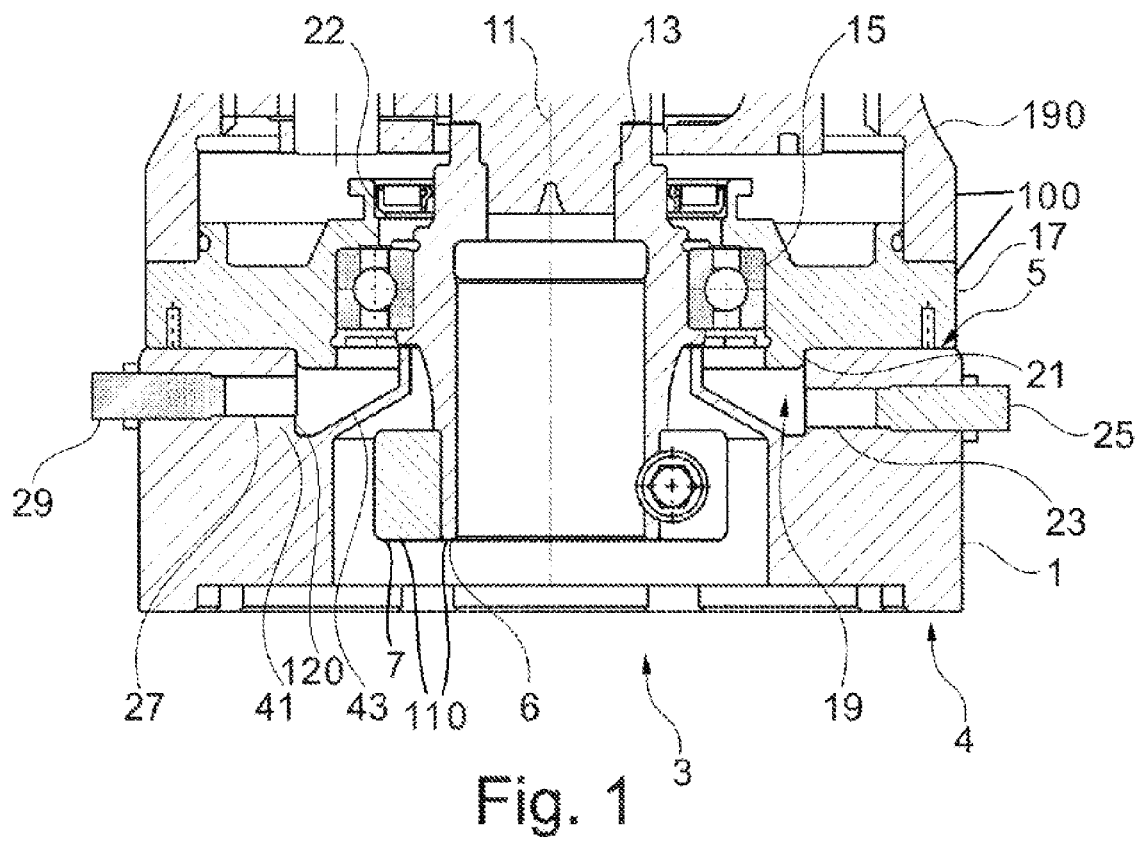
FIG. 1 is a schematic cut-out cross-sectional view of an adapter plate with a housing of a gear attached to the adapter plate according to a first embodiment.

Typical embodiments of the invention will be described below on the basis of the Figures, wherein the invention is not restricted to the exemplary embodiments, the scope of the invention being rather determined by the claims. In the description of the embodiment, identical reference numerals are potentially used for identical or similar parts in different Figures and for different embodiments so as to make the description clearer. However, this does not mean that corresponding parts of the invention are restricted to the variants represented in the embodiments.

Figure 2:
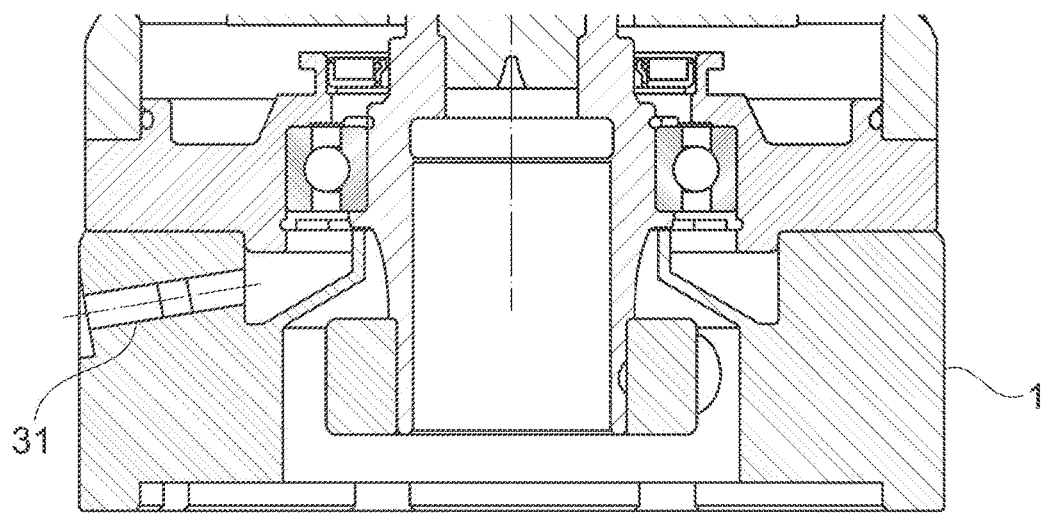
FIG. 2 is a further cut-out cross-sectional view of the adapter plate with the housing of the gear attached to the adapter plate according to the embodiment shown in FIG. 1.

FIG. 1 and FIG. 2 show an exemplary embodiment of an adapter plate 1 in two sectional planes which are rotated by 90° about the longitudinal axis of the adapter plate 1 or else about the axis of the passage opening of the adapter plate 1.

FIGS. 1 and 2 are therefore described together. This applies analogously also to FIGS. 3 and 4 which show a further embodiment. It should be pointed out that in FIGS. 2 and 4, not all of the reference numerals that had already been explained in conjunction with FIGS. 1 and 3, are shown again in each case.

The adapter plate 1 has a passage opening 3 in which a shaft coupling is arranged. The passage opening extends from a second front side 4 to a first front side 5 of the adapter plate 1. The passage opening 3 is arranged concentrically to an axis 11, which is the central axis of the adapter plate 1 and moreover corresponds also to the axis of rotation of the shaft coupling.

Furthermore, the passage opening 3 has a smaller first diameter on the side of the first front side 5 of the adapter plate 1 than on the opposite side of the second front side 4. The adapter plate 1 has a second diameter on the second front side 4 which is larger than the first diameter.

In the exemplary embodiment of FIGS. 1 and 2, the shaft coupling has a push-on sleeve 6 and a clamping ring 7, by means of which the push-on sleeve 6 can be clamped onto a shaft of an electric motor (both not illustrated in FIGS. 1 and 2).

Via the shaft coupling 110, a torque may be transferred to a gear 100 input shaft 13. The shaft coupling 110, to be more precise the push-on sleeve, is mounted by means of a drive bearing 15 which in turn is accommodated within a bearing flange 17. On the first front side 5 of the adapter plate 1, the bearing flange is screwed together with the adapter plate 1, on the one hand, and with a housing 190 of a gear 100 (only illustrated in cut-outs in FIGS. 1 and 2), on the other, wherein the screw connections are situated in another sectional plane.

In typical embodiments, an interior space of the gear which is filled with lubricant, or the interior space of a gear housing which is filled with lubricant, is sealed by means of a shaft sealing ring arranged, for example, within the bearing flange. In further embodiments, a seal is provided directly within the housing of the gear. When lubricant passes through a seal of the gear, lubricant might typically get to the motor through the drive bearing, in particular at least in substantially perpendicular installation positions of the axis of the passage opening of the adapter plate.

On the first front side 5, the adapter plate 1 has a groove 19 extending concentrically around the circumference of the passage opening 3, which is also engaged by a circumferential lug 21 of the bearing flange 17. Thus, the relative position of the adapter plate 1 and the bearing flange 17 can be secured relative to one another.

In a vertical installation position of the axis of the shaft coupling, as illustrated in FIGS. 1 and 2, lubricant can be collected during operation which could unexpectedly get, for example, through a shaft sealing ring 22 and the drive bearing 15 to the outside toward the adapter plate 1 and thus, during operation, toward a motor. For this purpose, the groove 19 is arranged in the area of the smaller first diameter of the adapter plate 1 on the first front side 5. The groove 19 thus is located below the drive bearing 15.

If lubricant gets into the asymmetrically V-shaped groove 19, it might, above a certain amount, surpass the board of the first sensor channel 23 so that lubricant could reach a first sensor 25. The first sensor channel 23 is configured in the radial direction relative to the axis 11. The first sensor 25 is configured as a capacitive sensor and may be in communication with a control unit in order to output a warning when lubricant and thus a leakage is detected. The first sensor 25 could therefore also be referred to as a leakage sensor.

Furthermore, a second sensor channel 27 is provided opposite the first sensor channel 23. In a vertical orientation of the axis 11 of the adapter plate 1, the board 120 of the second sensor channel 27 is higher than the board of the first sensor channel 23. In a vertical installation position of the axis 11, the second sensor channel 27 is likewise oriented horizontally.

With the higher board, the second sensor channel 27 is wetted by lubricant only after the first sensor channel 23 in the event of a leakage. A second sensor 29 provided in the second sensor channel 27 may be used as an alarm sensor. A control unit (not shown in FIGS. 1 and 2) connected to the second sensor 29, may output an alarm when lubricant is detected by the second sensor 29.

The embodiment of the adapter plate 1 and the gear with the adapter plate 1, as illustrated in FIGS. 1 and 2, has a plurality of channels connected to the groove 19, wherein the sensor channels 23 and 27 shown in FIG. 1 have been described so far.

In an axial projection, the groove 19 is configured so as to at least partially overlap the drive bearing 15. The first diameter of the adapter plate 1 is smaller than or equal to an outer diameter of the push-on sleeve, in particular an outer diameter in the area of a cantilever extension of the push-on sleeve for supporting the drive bearing.

In FIG. 2, a further channel of the channels of the adapter plate 1 is illustrated. The further channel is an overflow channel 31 which is likewise connected to the groove 19. In some embodiments, only the overflow channel 31 is provided, or the overflow channel 31 having merely a further one of the sensor channels 23 and 27.

The overflow channel 31 is guided to the outside of the adapter plate 1. This means in particular that the overflow channel ends on one of the side surfaces of the adapter plate.

To the outer end of the overflow channel, an overflow reservoir may be connected, for example. It may also be provided in embodiments that the overflow channel can be closed by a screw at the end.

The overflow channel 31 mainly extends in the radial direction away from the groove 19. However, in a vertical installation position, the overflow channel 31 is slightly inclined downwards toward the outside of the adapter plate 1 with respect to the radial direction and thus with respect to the horizontal. This facilitates a run-off of overflowing lubricant. In the exemplary embodiment of FIG. 1, the angle with respect to the horizontal is about 10°.

In the exemplary embodiment of FIGS. 1 and 2, the overflow channel 31 is the only channel having an inclined configuration, whereas the two sensor channels are configured horizontally. However, all of the channels may also be configured to be inclined, where appropriate, to be inclined at different angles or equal angles.

The overflow channel 31 has a board, which, in a vertical installation position, is even higher than the board of the second sensor channel 27. This achieves that the overflow channel 31 is only impinged after an alarm has been triggered in response to detecting lubricant at the second sensor. In further embodiments, the overflow channel 31 may also be provided to have the same height as the board in a vertical installation position, in order to discharge lubricant in a timely manner, for example.

It can be recognized in FIGS. 1 and 2 that the groove 19 has an asymmetrical V-shape. In this case, a wall 41 situated radially outside is oriented perpendicularly, and a wall 43 of the groove 19 situated radially inside is configured obliquely. In embodiments, this results on the inner side of the adapter plate also to a uniform transition from the second diameter to the first diameter or causes arising lubricant to flow within the groove 19 toward the outside, where the channels 23, 27 and 31 are arranged.

Figure 3:
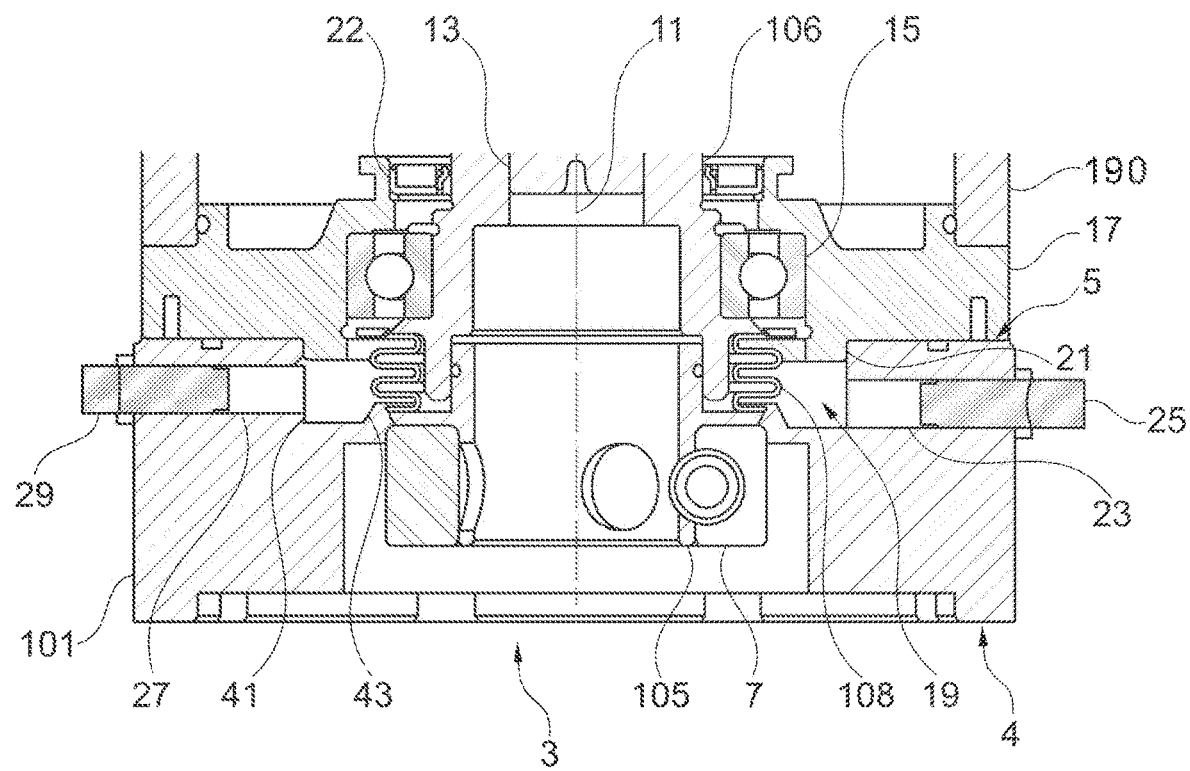
FIG. 3 is a schematic cut-out cross-sectional view of an adapter plate with a housing of a gear attached to the adapter plate according to a second embodiment.
Figure 4:
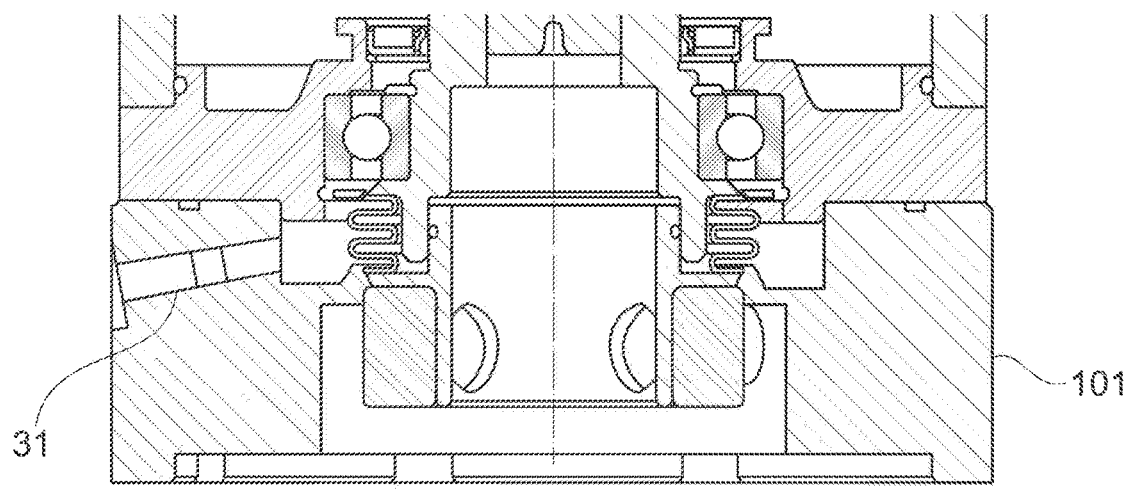
FIG. 4 is a further cut-out cross-sectional view of the adapter plate with the housing of the gear attached to the adapter plate according to the embodiment shown in FIG. 3.

In FIGS. 3 and 4, a further embodiment is illustrated differing in some details from the embodiment of FIGS. 1 and 2. The embodiment of FIGS. 3 and 4, however, also has similar or identical features which are not designated again by the same reference numeral and will not be explained again completely.

The adapter plate 101 which is shown in FIGS. 3 and 4 has a passage opening 3, in which a two-part sleeve clamped by a clamping ring 7 is accommodated. The sleeve 105, 106 has a lower part 105 and an upper part 106, wherein, on closer inspection, it is clear that the lower part 105 is clamped by the clamping ring 7.

The two parts 105 and 106 of the sleeve are connected by a bellow 108 and welded together.

The bellow allows an axial compensation to be achieved in embodiments.

The inner diameter of the first diameter of the adapter plate is configured to be smaller than an outer diameter of the shaft coupling, in particular than an outer diameter of the bellow of a shaft coupling formed as a bellow coupling. In this way, the groove can reach far enough into the inside so as to collect in typical embodiments, for example, lubricant flowing off on the bellow.

The invention is not restricted to the embodiments described above, the scope of the inventions is rather determined by the attached claims.

The invention claimed is:

1. An adapter plate for connecting a housing of a gear, the adapter plate comprising:
    a passage opening for receiving a shaft coupling at least partially,
    a groove arranged in a first front side of the adapter plate and extending circumferentially around the passage opening, and
    at least two channels which are in communication with the groove,
    wherein one of the at least two channels comprises a first sensor channel and a first sensor in communication with the first sensor channel, wherein the first sensor is suitable to detect lubricant, and
    wherein another of the at least two channels comprises a second sensor channel and a second sensor in communication with the second sensor channel, wherein the second sensor is suitable to detect lubricant.

2. The adapter plate according to claim 1, further comprising an overflow channel for discharging lubricant from the groove to the outside of the adapter plate.

3. The adapter plate according to claim 2, wherein the overflow channel is inclined with respect to a plane situated perpendicular to a direction of the passage opening.

4. The adapter plate according to claim 1, wherein the adapter plate is provided for an installation position with an at least substantially vertically standing axis of the shaft coupling, wherein the groove is arranged on the first front side of the adapter plate that is situated above, and wherein the second sensor channel has a board in an outer wall of the groove that is situated higher than the first sensor channel.

5. The adapter plate according to claim 1, wherein the first sensor channel and the second sensor channel are arranged in different axial planes.

6. The adapter plate according to claim 1, wherein the passage opening has a first diameter and a second diameter that is larger with respect to the first diameter, wherein the groove is arranged at least partially in an axial area of the first diameter.

7. The gear according to claim 6, wherein the first diameter of the passage opening of the adapter plate is smaller than an outer diameter of a drive bearing for mounting the shaft coupling.

8. A gear with the adapter plate according to claim 1, wherein the adapter plate is attached to a housing of the gear.

9. The gear according to claim 8, with a bearing flange arranged between the adapter plate and the housing of the gear.

10. The gear according to claim 9, wherein the bearing flange engages into the groove in an axial direction.

11. The gear according to claim 9, wherein a drive bearing of the shaft coupling is accommodated within the bearing flange.

12. The adapter plate according to claim 1, wherein the shaft coupling is at least partially received within the passage opening of the adapter plate.

13. An adapter plate for connecting a housing, the adapter plate comprising:
    a passage opening for receiving a shaft coupling at least partially,
    a groove arranged in a first front side of the adapter plate and extending circumferentially around the passage opening, and
    at least two channels which are in communication with the groove,
    wherein one of the at least two channels comprises an overflow channel for discharging lubricant from the groove to the outside of the adapter plate, and
    wherein another of the at least two channels comprises a first sensor channel and a first sensor in communication with the first sensor channel, wherein the first sensor is suitable to detect lubricant.

14. The adapter plate according to claim 13, wherein the overflow channel is inclined with respect to a plane situated perpendicular to a direction of the passage opening.

15. The adapter plate according to claim 13, wherein the passage opening has a first diameter and a second diameter that is larger with respect to the first diameter, wherein the groove is arranged at least partially in an axial area of the first diameter.

16. An adapter plate which is attached to a housing of a gear, the adapter plate comprising:
    a passage opening for receiving a shaft coupling at least partially,
    a groove arranged in a first front side of the adapter plate and extending circumferentially around the passage opening, and
    at least one channel which is in communication with the groove,
    wherein a bearing flange is arranged between the adapter plate and the housing of the gear, and
    wherein the bearing flange engages into the groove in an axial direction.

17. The adapter plate according to claim 16, wherein a drive bearing of the shaft coupling is accommodated within the bearing flange.

* * * * *